United States Patent [19]
Abrams et al.

[11] Patent Number: 5,770,127
[45] Date of Patent: Jun. 23, 1998

[54] CARBON OR GRAPHITE FOAM REINFORCED COMPOSITES

[75] Inventors: Frances L. Abrams, New Carlisle; Joseph W. Hager; Richard B. Hall, both of Dayton, all of Ohio

[73] Assignee: The United States of America as represented by the Secretary of the Air Force, Washington, D.C.

[21] Appl. No.: 692,902

[22] Filed: Jul. 15, 1996

[51] Int. Cl.[6] .................................................. C01B 31/00
[52] U.S. Cl. .......................................... 264/29.1; 264/297
[58] Field of Search .................................. 264/29.1, 29.7

[56] References Cited

U.S. PATENT DOCUMENTS 4,832,881  5/1989  Arnold, Jr. et al. .................... 264/29.7
5,232,772  8/1993  Kong .................................... 438/312.2

*Primary Examiner*—Richard Weisberger
*Attorney, Agent, or Firm*—Fredric L. Sinder; Thomas L. Kundert

[57] ABSTRACT

A new apparatus and method for making a carbon or graphite reinforced composite is described. A rigid carbon foam preform is placed within a sealed flexible bag. A vacuum is created within the bag. Matrix resin is introduced into the bag, through an inlet valve, and is amply impregnated into the preform. The resulting resin-filled preform is exposed to a heat source to cure the preform. The resulting carbon or graphite reinforced composite structure is then removed from the bag.

4 Claims, 2 Drawing Sheets

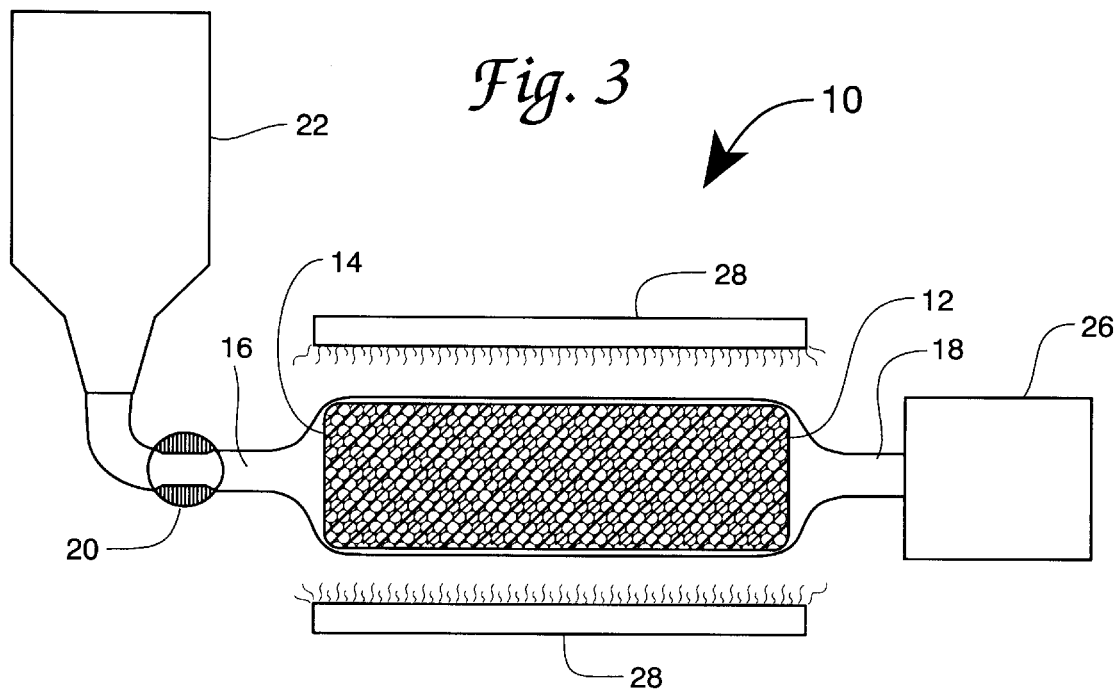
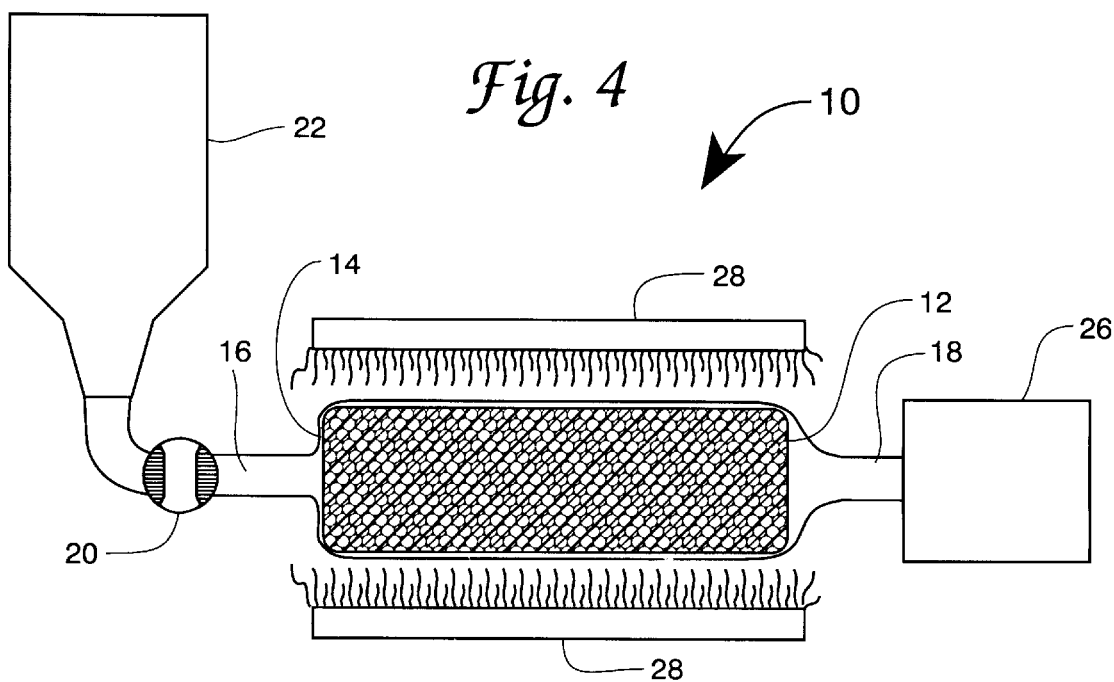

CARBON OR GRAPHITE FOAM REINFORCED COMPOSITES

RIGHTS OF THE GOVERNMENT

The invention described herein may be manufactured and used by or for the Government of the United States for all governmental purposes without the payment of any royalty.

BACKGROUND OF THE INVENTION

The present invention relates generally to carbon reinforced composites, and more specifically to the use of rigid carbon or graphite foams to reinforce polymer matrix composites.

Advanced, or high performance, composites are high modulus (stiffness), high strength composite materials used in applications requiring high strength to weight ratios. They are typically made by embedding very high stiffness fibers, such as glass, carbon, graphite or silicon carbide, into a polymer matrix. The polymer matrix may be made either from thermosetting matrix resins, such as an epoxy, polyester or isocyanate resin, or from thermoplastic matrix resins, such as nylons, polycarbonates, acetals, polyethylenes, some polyesters, polysulfone and polyetheretherketone. Thermosetting matrix resins take a permanent set when molded, and cannot thereafter be remolded. Thermoplastic matrix resins become soft and pliable when heated and may be remolded without changing their physical properties. The embedded fibers provide stiffness and strength to the composite material, but are brittle and highly sensitive to cracks and flaws. The matrix material absorbs energy, transfers the load from fiber to fiber and hinders the spread of small cracks. The presence of a matrix allows a closer approach to using the theoretical maximum strength of the fibers in practical applications.

One type of these advanced composites is carbon fiber reinforced polymeric matrix composites (CFPMCs). There are several methods for manufacturing CFPMCs. The primary method used in structural applications is lamination. In this method, layers of continuous fibers are combined with matrix resins and laminated into a solid structure by application of heat and pressure. This process involves numerous steps. A major cost associated with this process is the requirement for large pressurized ovens known as autoclaves to "cure" and consolidate the laminate. The mechanical properties of these composites are anisotropic, that is, directional, due to the alignment of the carbon fibers. Thus, these composites are especially weak in the transverse direction, the direction perpendicular to the fibers, because the resin strength and stiffness is orders of magnitude less than that of the fiber. Some experimentation with reinforcement in the transverse direction has improved properties, but it is still possible for the fibers to slip past each other, leading to matrix damage and irreversible deformation of the composite.

One proposed improvement on the lamination process is known as Resin Transfer Molding (RTM). In this method, a preform is woven or braided out of dry fibers and placed in a double-sided rigid mold. A vacuum is drawn on the mold, the mold heated, and resin is then heated and introduced through one or more ports into the mold to fill the mold. The resulting matrix is cured within the mold to form a solid carbon fiber reinforced polymeric matrix composite. Both the rigid mold and the fiber preform add to the cost of the resin transfer molding process. However, because the mold can be re-used, the greater the number of parts made, the less impact the cost of the mold has on the process. The possibility of amortizing high mold costs over many parts makes RTM a likely approach for greater use of advanced composites in the automobile industry.

In the resin transfer molding process, the preform must be carefully placed in the mold to align the fibers in chosen directions and, often, some sizing must be added before closing the mold to hold the fibers in place during resin flow. The carbon fiber reinforced polymeric matrix composite produced is anisotropic due to the individual, continuous fibers which complicates design and makes machining the finished product undesirable. Fiber volume is generally on the order of 60–70%.

Another variation on the lamination process, particularly for larger parts which must be lightweight, is a sandwich process in which the laminations are wrapped around a foam core and the resin impregnated into the laminations by a vacuum drawn inside a flexible sealed bag. The resin is prevented from infiltrating the foam core, impregnating only the surface layers. Among other problems, the hard interface between the impregnated laminations, or facesheet, and the foam core limit the usefulness of these sandwich composites for high strength requirements.

It is seen, therefore, that there is a need for an apparatus and method for making carbon reinforced composite structures without the deficiencies of the prior art.

It is, therefore, a principal object of the present invention to provide an apparatus and method for making carbon reinforced composite structures without the need for complicated preparation of fibrous preforms, expensive molds and specialized tooling.

It is another object of the present invention to make an improved carbon reinforced composite material or structure without hard interfaces.

It is a feature of the present invention that it uses a self-rigidizing carbon reinforcement structure, eliminating the need for expensive molds and specialized tooling.

It is another feature of the present invention that it uses a rigid carbon or graphite foam as a preform.

It is a further feature of the present invention that when graphite is used as the foam preform, the resulting composite structure exhibits three-dimensional electrical conductivity.

It is an advantage of the present invention that its self-rigidizing carbon or graphite foam reinforcement is both isotropic and continuous, so that resulting composites are more uniformly strong in all directions and have greater resistance to shear forces than composites formed from fibrous preforms.

It is another advantage of the present invention that the foam preform can be machined into various shapes which allows this invention to easily produce components of varying geometries.

It is a further advantage of the present invention that the three dimensional strut-like structure of the foam is similar to truss construction in bridges and provides greater resistance to shear forces than fibrous preforms.

It is yet another advantage of the present invention that resulting composite structures are lightweight, and both straightforward and inexpensive to manufacture.

It is yet a further advantage of the present invention that, when foams are manufactured, other forms of carbon reinforcement, such as continuous fibers or cloth may be added to the foam, forming a continuous interface between core and facesheet.

It is still another advantage of the present invention that it is particularly suitable for low-cost manufacturing of just one or a few complex high performance composite parts.

These and other objects, features and advantages of the present invention will become apparent as the description of certain representative embodiments proceeds.

SUMMARY OF THE INVENTION

In accordance with the foregoing principles and objects of the present invention, a novel apparatus and method for making a carbon or graphite foam reinforced composite structure is described. The unique discovery of the present invention is that a rigid porous carbon structure, particularly a self-rigidizing carbon or graphite foam, can be used as the carbon reinforcement in a carbon reinforced composite to make carbon reinforced composite structures, without a need for expensive molds and specialized tooling, and which are easier to manufacture and which have greatly improved physical properties over carbon reinforced composite structures made according to the teachings of the prior art.

The apparatus used to produce the carbon reinforced composite structures consists of a flexible bag for holding a foam preform. A resin inlet valve and resin source are attached to one end of the bag. A vacuum port and vacuum source are attached to the other end of the bag. The bag containing the preform is thermally coupled to a heat source.

The apparatus can be used to produce carbon or graphite reinforced composites. A preform is placed within the flexible bag. A vacuum is created within the bag. The preform is then heated. Resin is introduced into the bag through the resin inlet valve. After the resin is amply impregnated into the preform, the inlet valve is closed and the preform is cured. Once the preform is cured, the resulting composite structure is removed from the bag.

DESCRIPTION OF THE DRAWINGS

The present invention will be more clearly understood from a reading of the following detailed description in conjunction with the accompanying drawings wherein:

FIG. 3 is a schematic view of the FIG. 1 apparatus showing the apparatus after the resin has been vacuum impregnated into the preform; and, FIG. 4 is a schematic view of the FIG. 1 apparatus showing the curing of the resulting resin-filled foam preform to form a carbon or graphite reinforced composite structure.

DETAILED DESCRIPTION

Figure 1:
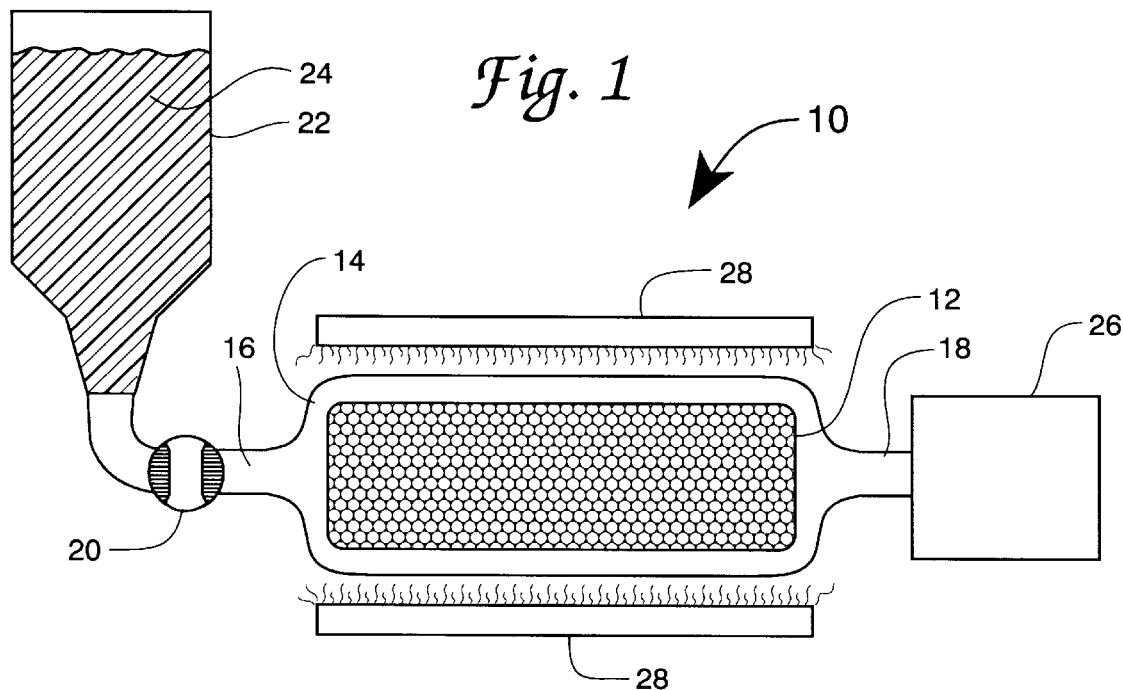
FIG. 1 is a schematic view of an apparatus for making a carbon or graphite reinforced composite according to the teachings of the present invention showing a flexible bag and a rigid carbon foam preform prior to the creation of a vacuum inside the bag.

Referring now to FIG. 1 of the drawings, there is shown a schematic view of an apparatus 10 for making a carbon or graphite reinforced composite. A rigid foam preform 12 is formed from a rigid, carbonaceous or graphitic open celled foam, where the foam preferably has a relatively small cell size and completely open porosity. A suitable carbon foam can be made by carbonizing a phenolic foam in an inert atmosphere. A suitable starting phenolic foam is available from American Foam Technologies in Ronceverte, W.Va., and is the same kind of foam commonly used by florists to hold cut flowers. Those with skill in the art of the invention are familiar with such carbonization processes. Typically, the foam is heated in the inert atmosphere at temperatures about 1,600°–2,000° F. until completely carbonized. A suitable graphite foam can be made by dissolving at elevated temperatures (about 300° C.) and pressures as much nitrogen as possible into a high quality mesophase pitch. When the pressure is relieved, the nitrogen expands, forming a pitch foam. The pitch foam is then oxygen stabilized at about 200°–250° C. to crosslink the pitch to strengthen the foam. Finally, the pitch foam is heat treated at high temperatures (about 2,000°–2,500° F.) in an inert atmosphere to form a graphite foam. Those with skill in the art of the invention are similarly familiar with such graphitizing processes. Graphitic foams, compared to amorphous carbon foams, have an anisotropic microstructure and exhibit greater strength in the direction of the microfibers. For both carbon and graphite foams, a preferred cell size is about 50 microns.

Preform 12 is machined into the desired shape of the composite part to be created. A flexible vacuum bag 14 made of an elastomeric, non-porous material, having a first opening 16 and a second opening 18, is then sealed around preform 12. A resin inlet valve 20 is coupled to the first opening 16 of flexible bag 14. A resin container 22, which stores a quantity of resin 24, is attached to resin inlet valve 20. A vacuum source 26 is coupled to the second opening 18 of flexible bag 14. Flexible bag 14 containing foam preform 12 is thermally coupled to a heater 28.

Figure 2:
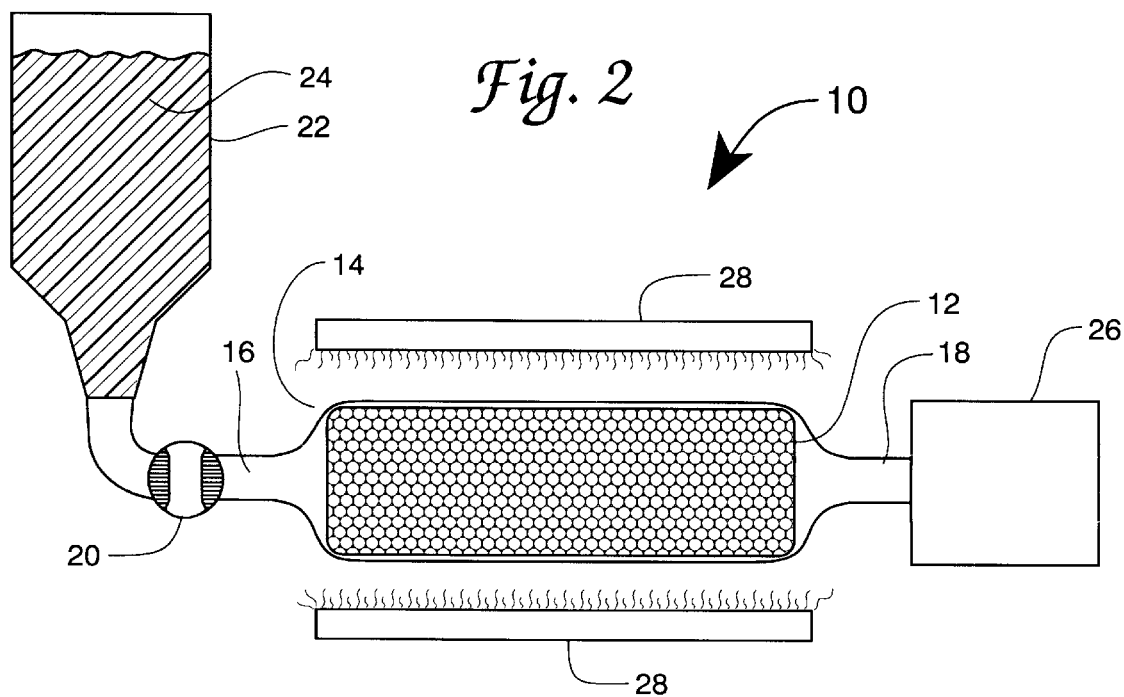
FIG. 2 is a schematic view of the FIG. 1 apparatus showing the apparatus with a vacuum created inside the bag just before resin is added to the bag.

FIG. 2 shows flexible bag 14 surrounding foam preform 12 after a vacuum has been created inside bag 14 from the use of vacuum source 26. The vacuum created within bag 14 is sufficient to enable resin 24 to flow from resin source 22 into bag 14 and to be amply impregnated into preform 12. "Amply impregnated" is understood to mean as completely as desired for a specific application, and in every case beyond the surface layers of the preform, but that every cell may not, as a practical matter, be filled.

FIG. 3 shows the resin impregnation of foam preform 12. Flexible bag 14 and preform 12 are heated through the use of heater 28. The temperature of heater 28 is sufficient to enable resin 24 to flow into bag 14 and be amply impregnated into preform 12. Resin inlet valve 20 is then opened to allow resin 24 to flow from resin container 22, through resin inlet valve 20 and into flexible bag 14. Resin 24 is then amply impregnated into foam preform 12.

FIG. 4 shows the curing of foam preform 12. After resin 24 has been amply impregnated into foam preform 12, resin inlet valve 20 is closed. Foam preform 12 is then cured by exposing it to heat created by heater 28. The temperature of the heat provided is that which is conventionally used to cure carbon reinforced composite structures. This heat is provided for a period of time sufficient to completely cure the resin and result in a carbon reinforced composite structure.

Curing foam preform 12 results in a carbon reinforced composite structure which is then removed from bag 14.

Preferred resins include isocyanates, epoxies, phenolics and cyanate esters.

The resulting carbon reinforced composite structure will have a low fiber volume, so that its ultimate strength in the fiber directions of the carbon reinforcement may not be as high as other advanced composites, but it will be much stronger in shear and will have the significant advantages of being manufactured by a tool-less procedure and being able to be machined into different advantageous shapes. Also, the normalized strength for the fiber volume should be higher.

A modification to the described invention can produce a foam core composite with a laminated facesheet, but without the hard interface between foam and laminations as found in the prior art. Graphite cloth can be placed around the mesophase pitch during the graphite foam making procedure and the pitch foam will foam through the cloth, forming a foam integrated structure with a soft interface.

Another modification to the described invention is to impregnate the carbon foam by carbon vapor deposition (CVD) to form a carbon matrix, carbon-carbon, composite.

The disclosed apparatus and method for making a carbon or graphite reinforced composite structure successfully demonstrates the advantages of using a preformed rigid structure as the reinforcing element for a composite structure. Although the disclosed invention is specialized, its teachings will find application in other areas where the manufacturing of complex shapes can be simplified.

As used in the claims, the term "carbon" is understood to include all forms of carbon, including graphite.

The described invention provides a novel apparatus and method for making a carbon or graphite reinforced composite structure. Alternatively, closely packed, flocked, short carbon fibers rigidized with phenolic could be used for a preform, or any rigid porous carbon structure. Also, the heater could be replaced by heating blankets. For large-scale manufacturing, multiple resin and vacuum sources, combined with multiple ports and valves can be used. It is understood that other modifications to the invention may be made, as might occur to one with skill in the field of this invention, within the scope of the appended claims. Therefore, all embodiments contemplated have not been shown in complete detail. Other embodiments may be developed without departing from the spirit of this invention or from the scope of the appended claims.

We claim:

1. A method for making a carbon or graphite reinforced composite structure comprising the steps of:

(a) providing a flexible bag for holding a rigid porous carbon preform, the flexible bag having a first end and a second end with openings at each end;

(b) providing a matrix resin inlet valve, attached to the opening at the first end of the bag, for enabling and disabling a flow of matrix resin to the bag;

(c) providing a matrix resin source, containing a quantity of matrix resin, attached to the matrix resin inlet valve;

(d) providing a vacuum port, connected to the opening at the second end of the bag, for coupling the bag to a vacuum source;

(e) providing a vacuum source connected to the vacuum port;

(f) providing a heat source for providing heat to the preform held inside the bag;

(g) placing the preform inside the flexible bag;

(h) next, activating the vacuum source to create a vacuum inside the bag;

(i) next, heating the bag and the preform;

(j) next, opening the matrix resin inlet valve to allow the matrix resin to flow into the bag and amply impregnate the preform;

(k) after the matrix resin is amply impregnated into the foam preform, closing the matrix resin inlet valve; and, (l) next, heating the bag and impregnated foam preform to cure the preform to result in the reinforced composite structure.

2. The method for making a carbon or graphite reinforced composite structure according to claim 3, wherein the rigid porous carbon preform is a carbon foam.

3. The method for making a carbon or graphite reinforced composite structure according to claim 1, further comprising the step of making the rigid porous carbon preform by heating a phenolic foam in an inert atmosphere at high temperatures to carbonize the phenolic foam and form an amorphous carbon foam.

4. The method for making a carbon or graphite reinforced composite structure according to claim 1, further comprising the step of making the rigid porous carbon preform by dissolving nitrogen into a pitch at elevated temperatures and pressures, relieving the pressure so that the nitrogen expands to form a pitch foam, oxygen stabilizing the pitch foam to strengthen the pitch foam, and then heat treating the pitch foam at high temperatures in an inert atmosphere to form a graphitic carbon foam.

\* \* \* \* \*